July 16, 1935.  J. G. CLEVELAND  2,007,963
FLUID CURRENT TURBINE
Filed May 3, 1934   2 Sheets-Sheet 1
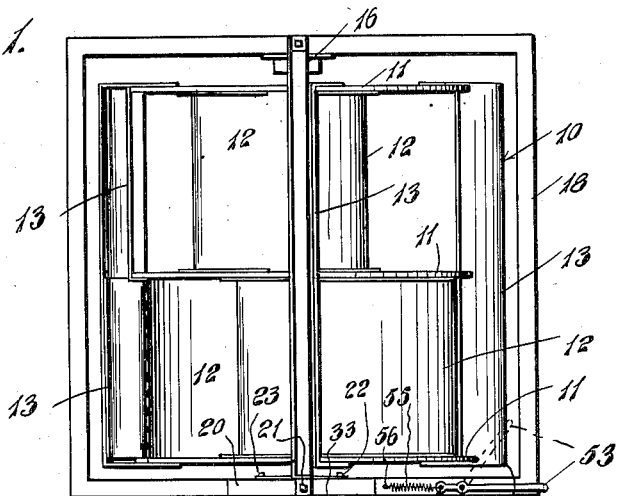
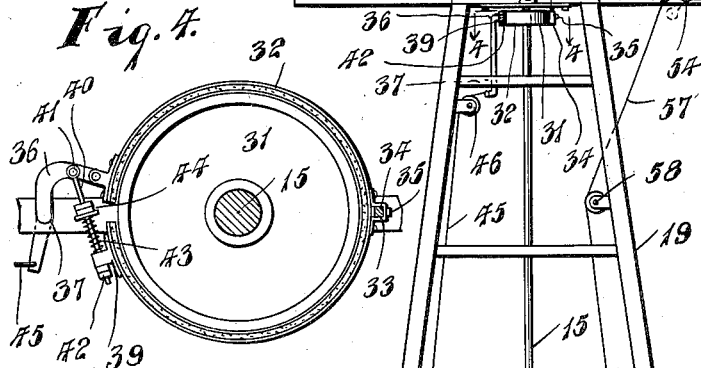
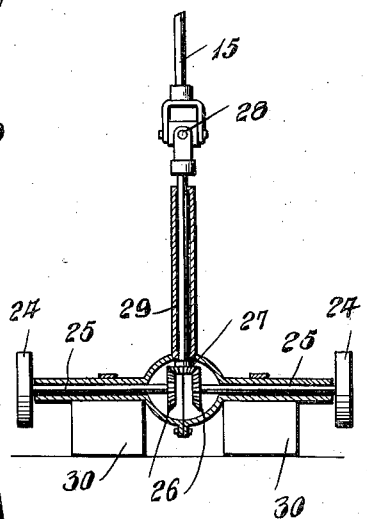
Inventor
J. G. Cleveland.

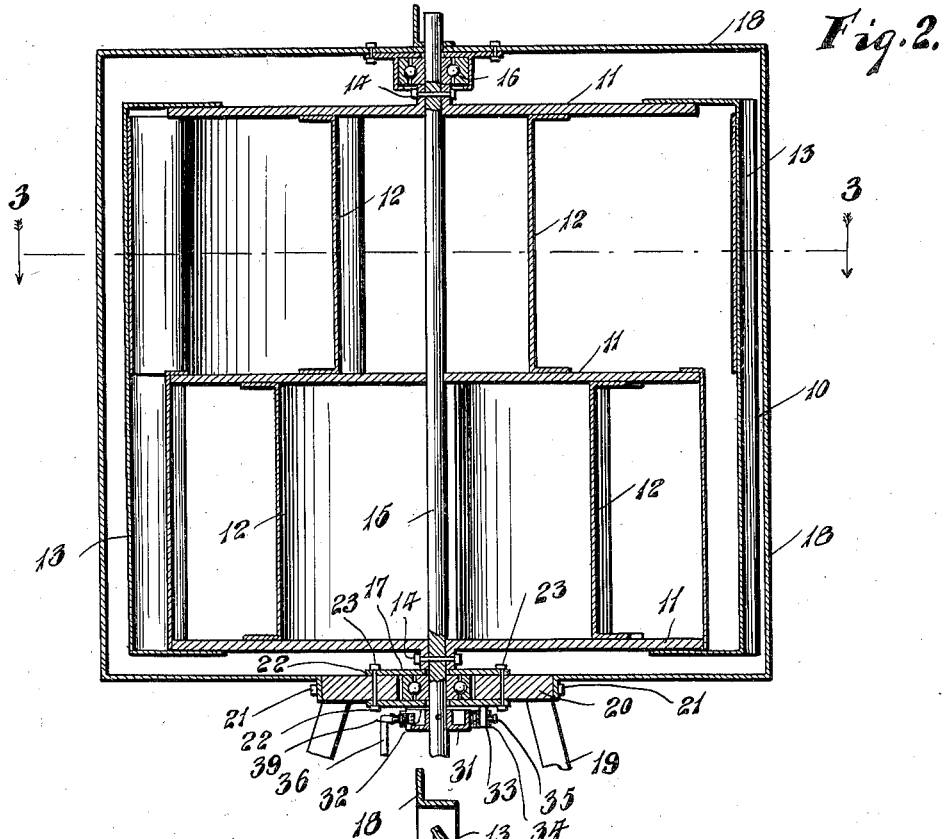
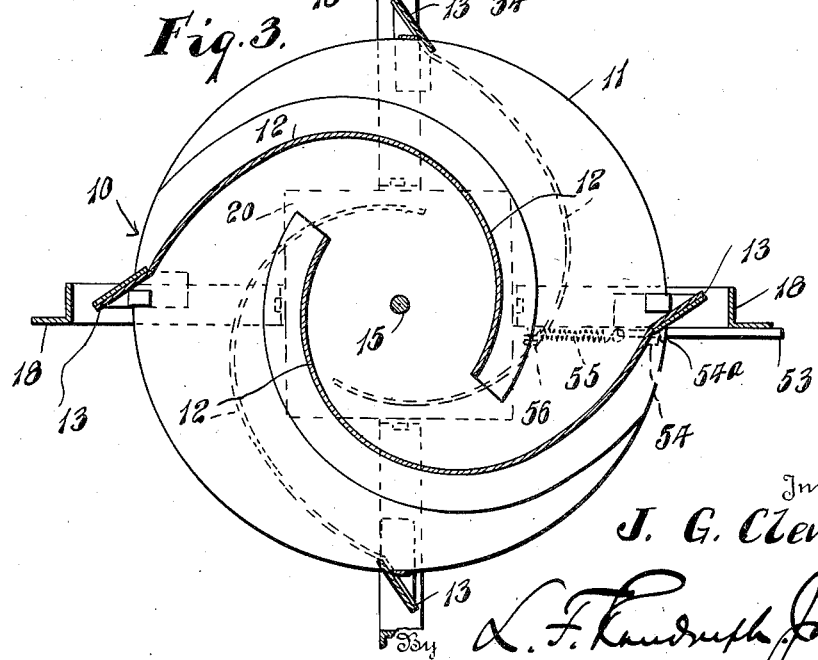

Patented July 16, 1935

2,007,963

UNITED STATES PATENT OFFICE 2,007,963

FLUID CURRENT TURBINE

James G. Cleveland, Enid, Okla.

Application May 3, 1934, Serial No. 723,762

4 Claims. (Cl. 170—13)

This invention relates to a fluid current turbine primarily adapted to be driven by the wind or by water.

It is particularly aimed to provide a novel construction improved with respect to the turbine proper and also having novel braking means and mechanism whereby the turbine may be locked in a stationary condition.

The device is of such character that the power derived may be used for any desired purpose, for instance for pumping water, for operating a generator, an electric ice-box, for charging batteries, or for various machines such as for ironing, radio, and washing.

The more specific objects and advantages will become apparent from a consideration of the description following taken in connection with accompanying drawings illustrating an operative embodiment.

In said drawings:—

Figure 1 is a view of the invention in side elevation,

Figure 2 is an enlarged central vertical sectional view through the turbine,

Figure 3 is a cross sectional view taken on the line 3—3 of Figure 2,

Figure 4 is a cross sectional view taken on the line 4—4 of Figure 1, and

Figure 5 is a detail sectional view through the power take-off part of the apparatus.

Referring specifically to the drawings, 10 designates a turbine proper or rotor which comprises three parallel horizontal disks 11 with a pair of vanes 12 disposed between and rigidly connected with the adjacent disk so that the rotor is a rigid unit. Said disks are preferably arcuate as shown, those of each pair starting at diametrically opposite points, as best shown in Figure 3 and ending at diametrically opposite points, each past the inner end of the other vane. The ends of the vanes are extended in the form of bars 13 so that such ends will extend throughout the length of the rotor and connect all three of the disks 11.

Said rotor or turbine proper is bolted as at 14 or otherwise rigidly secured to a vertical shaft 15 and such shaft is preferably journaled in bearings 16 and 17. The bearing 16 is carried by a skeleton framework 18 disposed about the rotor. To assist in obtaining the maximum effect of the air or water current, it will be noted that the vanes 12 of one pair are staggered with respect to the vanes 12 of the other pair as best suggested in Figure 3.

The rotor may be supported in any suitable manner and on any desired structure. For example, it is shown as mounted on a conventional skeleton tower 19 provided with a crown plate 20 to which the frame 18 is fastened as at 21. Bearing 17 is disposed in plate 20 and held in position through the medium of metallic plates 22 bolted as at 23 against the upper and lower surfaces of such crown plate.

The power generated through operation of the turbine or rotor through the action of the air, water or other fluid current for which it is built, may be derived from pulleys 24 by way of example, carried by shafts 25 connected by means of bevel gears 26 with a bevel gear 27 on the shaft 15, it being noted that the latter is sectional and connected by a universal joint as at 28. The shafts 25 and adjacent gearing are encased as at 29 and the latter suitably supported as at 30, usually on the ground.

A brake drum 31 is rigidly connected to the shaft 15 preferably below the crown plate 20, and surrounding the same is a contractile brake band 32 positioned by means of a stud 33 depending from the crown plate and passing through a bracket 34 on the brake band, and which bracket carries a screw 35 adapted to bind against the lug or stud 33. The natural expansion of the brake band normally maintains the same out of engagement with the periphery of the drum 31. A lever 36 is pivoted at 37 on an adjacent part of the derrick and at 38 distributed adjacent one end of the split brake band 32. A lug 39 is fastened to the other end of said brake band and a bolt 40, pivoted at 41 to the lever 36 passes slidably through the lug 39, beyond the same having nuts 42 threaded thereon. An expansive spring 43 surrounds the bolt 40, abutting the bracket 39, and a stop means 44 on the bolt. Spring 43 as a result normally tends to hold the brake band expanded. A flexible draw element 45 is connected to the lever 36, passing over a guide pulley 46 secured to the derrick and being connected in any one of a series of openings 47, of a lever 48, according to the adjustment necessary. Lever 48 is pivoted at 49 to the derrick and it may be secured in an applied position, through the engagement of a pivoted hook 50 pivoted at 51 to the derrick, with openings 52 on the lever 48.

Means are also provided whereby the rotor may be locked in a stationary condition, incidental to which the operation of the brake to reduce the speed of rotation of the device is advisable. Such locking means comprises a latch lever 53 pivoted at 54 to the skeleton frame 18 and normally held retracted as shown in full lines in Figure 1, through the contractile action of a coil spring 55 fastened to that lever and also fastened at 56 to the frame 18. Connected to the lever 53 is a flexible draw element 57 trained over a guide pulley 58 on the tower 19, and also connected to a lever 59 pivoted at 60 on the tower. Said lever 59 is adapted to be depressed into the dotted line position shown in Figure 1 to move the latch 53 into the dotted line position of the same figure, which is the locked position. In said locked position, the latch lever 53 engages a notch 54 in the lowermost disk 11. In the lowermost position of the lever 59, it is adapted to be secured by means of a padlock 61 which simultaneously engages staples 62 and 63 on the lever and on the tower, respectively.

It is to be understood that the invention has been illustrated as operable by the wind only, that it may be constructed for operation by a water current, and that other changes may be resorted to provided they fall within the spirit and scope of the invention.

I claim as my invention:—

1. A turbine of the class described having a rotor, said rotor having a plurality of vanes of arcuate form, the inner ends of the vanes crossing a line intersecting both ends of the adjacent vane, and similar vanes superposed with respect to the first mentioned vanes and staggered with respect thereto, the outer ends of the vanes being extended to constitute bars extending throughout the length of the rotor for the purpose specified.

2. A turbine of the class described having a rotor, said rotor having a plurality of vanes of arcuate form, the inner ends of the vanes crossing a line intersecting both ends of the adjacent vanes, similar vanes superposed with respect to the first mentioned vanes and staggered with respect thereto, the outer ends of the vanes being extended to constitute bars extending throughout the length of the rotor, and disks between the vanes to which the bars are rigidly connected.

3. A turbine of the class described having a rotor, said rotor having a plurality of vanes of arcuate form, the inner ends of the vanes crossing a line intersecting both ends of the adjacent vane, similar vanes superposed with respect to the first mentioned vanes and staggered with respect thereto, the outer ends of the vanes being extended to constitute bars extending throughout the length of the rotor, disks between the vanes to which the bars are rigidly connected, a skeleton frame, a shaft journaled in the skeleton frame to which the rotor is secured, brake means for the shaft, and means to lock the rotor against movement relatively to the frame.

4. A turbine of the class described having a rotor, said rotor having a plurality of vanes of arcuate form, the inner ends of the vanes crossing a line intersecting both ends of the adjacent vane, similar vanes superposed with respect to the first mentioned vanes and staggered with respect thereto, the outer ends of the vanes being extended to constitute bars extending throughout the length of the rotor, disks between the vanes to which the bars are rigidly connected, a supporting structure, a frame secured to said supporting structure, a shaft journaled in said frame and carrying said rotor, a brake drum on the shaft below the frame, means connected to the supporting structure to operate said brake band relatively to the brake drum, a latch pivoted to the frame, and operating means for the latch on the tower, to apply the latch to the rotor to lock the rotor against movement relatively to the frame.

JAMES G. CLEVELAND.